Sept. 29, 1959 J. GARABEDIAN ET AL 2,906,557
VEHICLE MOUNTED TANK
Filed Jan. 6, 1958 2 Sheets-Sheet 1

JOSEPH GARABEDIAN
MIKE GARABEDIAN
CHARLES H. GARABEDIAN
INVENTORS
HUEBNER & WORREL
ATTORNEYS

BY

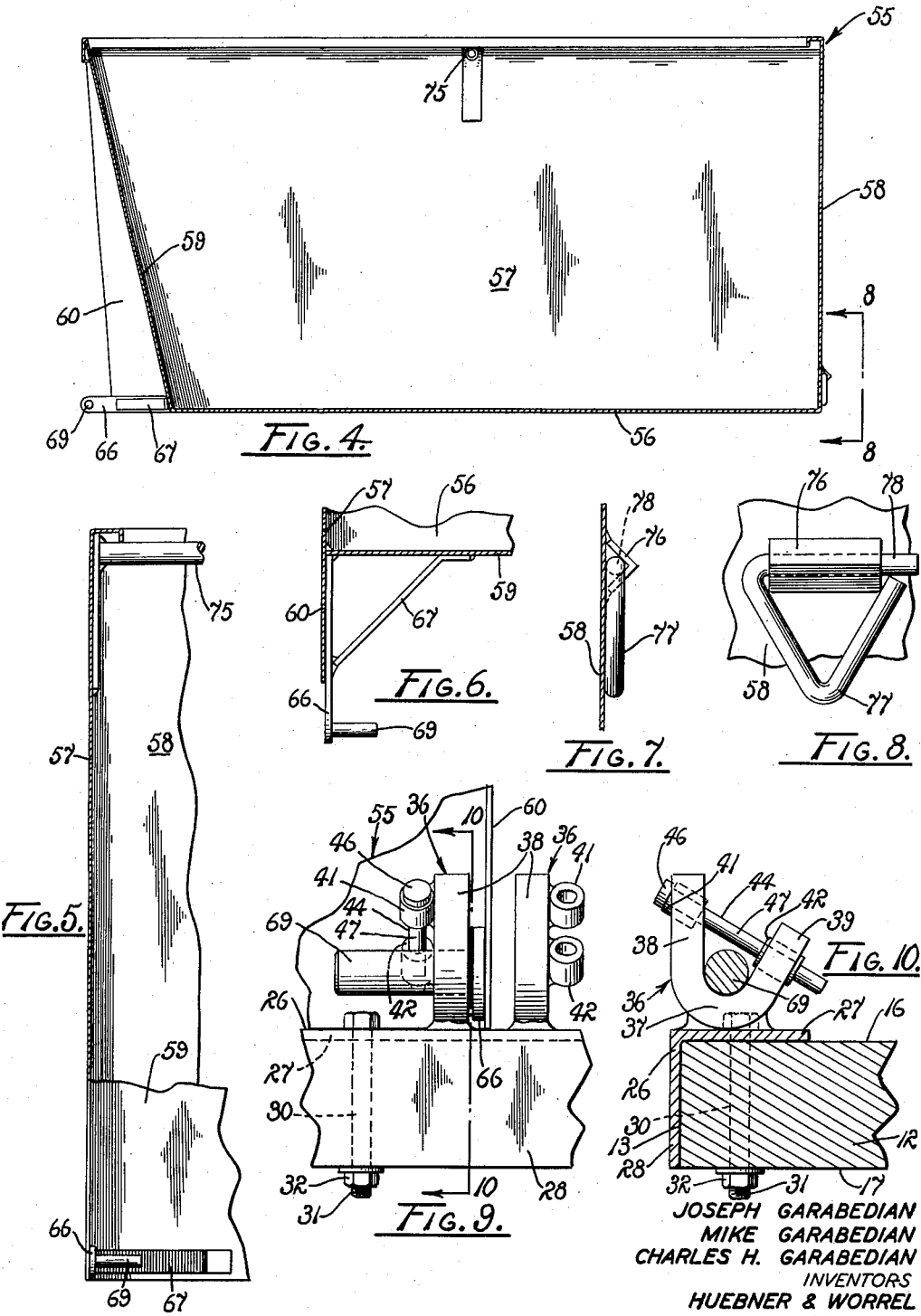

United States Patent Office 2,906,557
Patented Sept. 29, 1959

2,906,557

VEHICLE MOUNTED TANK

Joseph Garabedian, Mike Garabedian, and
Charles H. Garabedian, Fresno, Calif.

Application January 6, 1958, Serial No. 707,202

2 Claims. (Cl. 296—28)

The present invention relates to a vehicle mounted tank for bulk load handling and more particularly to a load receiving receptacle adapted to be mounted on, and removed from, a vehicle while loaded or unloaded and while mounted on the vehicle to be pivotal between predetermined transporting and dumping positions.

In the harvesting of grapes for market, the grapes are normally picked in bunches from the vines by field workers, placed in buckets, pans or boxes carried by the workers, and subsequently dumped into boxes. These boxes vary in size but normally hold from twenty-five to fifty pounds. The boxes are then generally dumped into tanks or gondolas carried by vineyard trucks which carry the grapes to a marshalling yard which is generally a site adjacent to a road in convenient proximity to the vineyard. Here, the tanks or gondolas of grapes are dumped into the tanks borne by larger highway trucks which transport the grapes to a winery.

This procedure is objectionable in many respects. The grapes are unnecessarily crushed because of the repeated dumping. Frequently as much as six inches of grape juice collect at the bottom of the tanks which carry the grapes to the winery. This grape juice deteriorates quickly and attracts insects. The resultant condition is highly unsanitary. The problem has become so acute in many areas that efforts have been made by public health agencies to avert it in some manner.

Additionally, this procedure is expensive and time consuming. A part of the grape crop is lost and much of it is depreciated in value. Labor costs are increased because of the several dumpings from one container to another and because of the delays incurred by truck drivers waiting for their trucks to be filled and dumped.

Accordingly, it is an object of the present invention to improve the sanitation in conveying grapes from field to winery.

Another object is to minimize the handling and resultant damage of grapes while being transported from vineyard to winery.

Another object is to minimize expense and time in delivering grapes from vineyard to winery.

Another object is to provide a container for bulk grapes which is adapted to be transported from a vineyard on a vineyard truck or the like and subsequently transferred to a highway truck, individually or with several other containers, for conveyance to a winery or other point of bulk deposit of the grapes with a minimum of handling, expense, deterioration, loss and delay.

Another object is to provide a tank adapted to be releasably mounted on a vehicle for movement between dumping and transporting positions.

Another object is to facilitate the pivotal attachment and detachment of a tank to and from a vehicle even while heavily loaded.

Other objects are to provide an apparatus of the nature described which is simple to construct and use, dependable in operation, durable in form, and adapted for handling a variety of materials.

These, together with other objects, will become more fully apparent upon reference to the following description.

In the drawings:

Fig. 4 is a somewhat enlarged transverse section taken on line 4—4 of Fig. 2.

Fig. 5 is a fragmentary somewhat enlarged side elevation of one of the apparatus taken at a position represented by line 5—5 of Fig. 1 and having portions of the tank thereof broken away to show a fulcrum rod mounted thereon.

Fig. 6 is a somewhat enlarged fragmentary horizontal section taken on line 6—6 of Fig. 2.

Fig. 7 is a fragmentary somewhat enlarged vertical transverse section taken on line 7—7 of Fig. 1.

Fig. 8 is a somewhat enlarged fragmentary side elevation of a portion of the tank on which a lifting eyelet is provided.

Fig. 9 is a fragmentary somewhat enlarged side elevation taken from a position represented by line 9—9 of Fig. 3.

Fig. 10 is a transverse vertical section taken on line 10—10 of Fig. 9.

Figure 1:
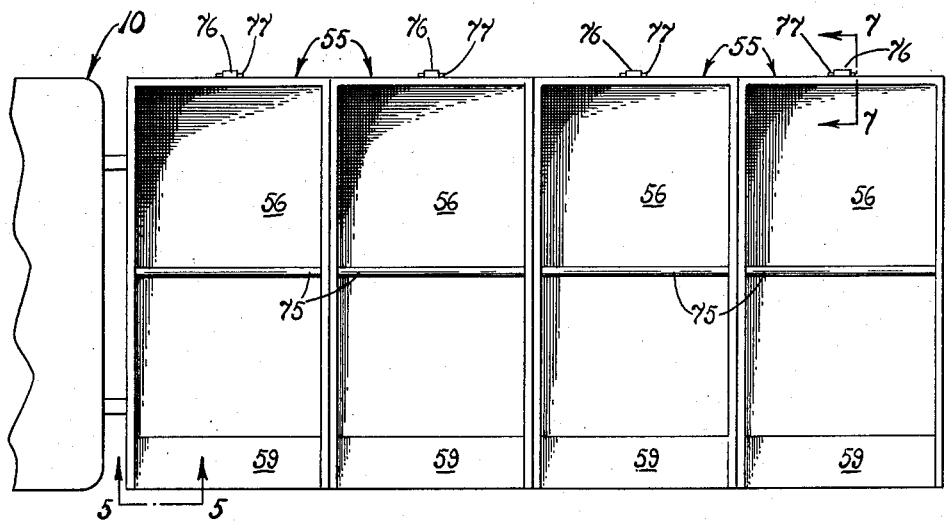
Fig. 1 is a fragmentary top plan view of a highway truck on which four load handling apparatus of the subject invention are mounted.
Figure 2:
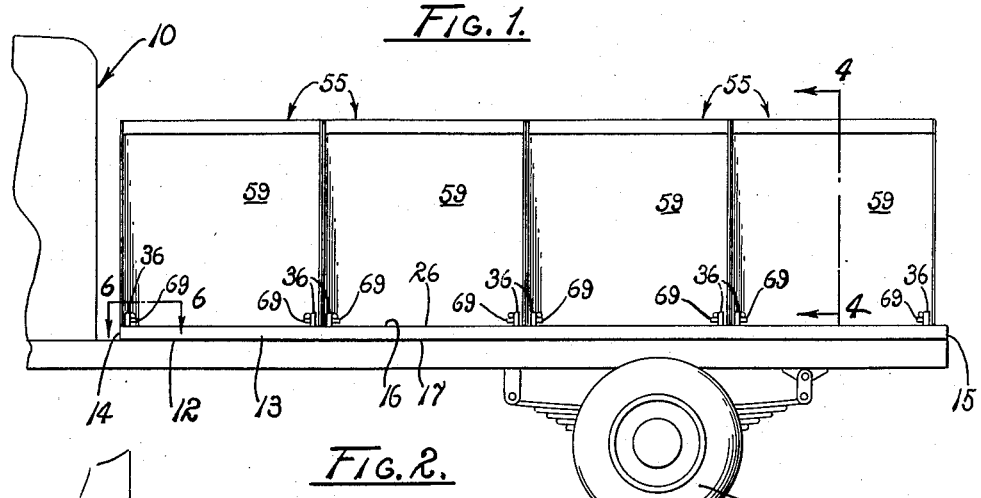
Fig. 2 is a side elevation of the truck and apparatus of Fig. 1.

Referring more particularly to the accompanying drawing, a truck, illustrative of a suitable support vehicle, is generally indicated by the numeral 10. The truck has a substantially rectangular, flat, horizontal bed 12 providing a pair of transversely spaced, longitudinally extended side edges 13, a front transverse edge 14, a rear transverse edge 15, an upper surface 16, and an underside 17. The truck includes ground engaging support wheels 20 mounting the bed for earth traversing movement in said horizontal position and along a line of travel longitudinally thereof.

Pairs of mounting brackets 26 provide horizontal flanges 27 rested in longitudinally spaced relation on the upper surface 16 of the bed 12 and dependent outer flanges 28 downwardly extended along a longitudinal side edge 13 of the bed. Bolts 30 provide upper ends secured to the horizontal flanges of the brackets and are downwardly extended through the bed so as to have a lower threaded end 31 extended below the underside 17 of the bed. Nuts 32 are screw-threaded on the lower ends of the bolts thereby securely to hold the brackets on the bed.

A plurality of substantially U-shaped, upwardly disposed, concave, coupling receptacles 36 are mounted along one of the longitudinal side edges 13 of the bed 12. Each receptacle provides an erect base 37 secured, as by welding, to the horizontal flange 27 of one of the mounting brackets 26, an outer substantially erect guide portion 38 upwardly extended from the base in substantially the same plane as the side edge, and an inner guide portion 39 inwardly upwardly inclined with respect to the bed and terminating slightly below the upper end of the outer guide portion. Bushing sleeves 41 and 42 are secured, as by welding, to the lateral edges of the inner and outer guide portions in coaxial alignment. The sleeves are concentric to a common axis downwardly inclined in acute angular relation to the bed of the vehicle. An elongated lock pin 44 provides a shank 45 releasably fitted in the aligned sleeves and a head 46 rested against the outer uppermost sleeve for limiting slidable movement of the shank.

The receptacles 36 are located along a side edge 13 of the bed 12, as described, and their guide portions 38 are disposed in common planes extended longitudinally of the bed. Further, the base portions are in substantial alignment longitudinally of the bed. As such, the receptacles define upwardly disposed sockets in longitudinal alignment on the bed. For purposes of the subsequent description, the receptacles are to be considered as being in pairs along the side of the bed.

A plurality of tanks 55 are provided. Since the tanks are of identical construction only one thereof will be described in detail. Each tank has a flat bottom wall 56, a pair of spaced parallel side walls 57 upwardly extended from the bottom wall, a perpendicularly upwardly extended rear wall 58 joining rear edges of the side walls and a front wall 59 forwardly upwardly inclined from the bottom wall in obtuse angular relation therewith and likewise joining forward edges of the side walls. The tank has an upper down-turned rim circumscribing an open top. The substantially triangular side plates 68 protrude forwardly from the front wall as extensions of the side walls in spaced parallel relation.

Still referring to one of the tanks 55, arms 66 are forwardly extended from the side plates 68 adjacent to lower ends thereof and in transversely spaced parallel relation. For additional rigidity, gusset plates 67 extend between the front wall 59 and the arms. Male coupling studs 69 of cylindrical form are rigidly secured to the arms and inwardly extended therefrom in coaxial relation to each other transversely of the tank 55.

An elongated rod 75 provides opposite ends rigidly secured to the side walls 57 of each tank 55, within the tank, and on the opposite side of the center of gravity of the tank from the coupling studs 69. The rod extends transversely of the tank in parallel relation with the studs. Further, an angle bracket 76 is secured to the rear wall 58 of each tank adjacent to a lower edge thereof. A triangular lifting eyelet 77 provides an element 78 thereof pivotally fitted in the angle bracket.

The tanks 55 are releasably mounted on the bed 12 of the vehicle 10 in side-by-side relation longitudinally of the bed with the front walls 59 facing the side 13 of the bed on which the receptacles 37 are mounted. There is a pair of receptacles for each tank and the coupling studs 69 are arranged to fit in downward slidable association in the coupling receptacles associated with their respective tanks. When in position, and with the latch pins 44 slidably fitted in the sleeves 41 and 42, the tanks are individually mounted for pivotal movement between rested transporting positions on the bed and dumping positions upwardly inclined in spaced relation to the bed.

*Operation*

The operation of the described embodiment of the subject invention is believed to be readily apparent and is briefly summarized at this point.

In considering the operation of the invention, reference is conveniently made to improved procedures in connection with the harvesting of grapes for market.

The tanks 55 are adapted to be rested for earth traversing movement on individual vineyard trucks of well-known form, not shown. After the grapes are picked and placed in picking pans, the latter are dumped into the tanks. When the tanks are filled, they are individually transported on their vineyard trucks to a marshalling yard or roadside where lifting cables, not shown, are connected to the rods 75. With the empty truck 10 awaiting nearby, with the latch pins 44 removed, the loaded tank is lifted from its trailer by means of the rod 75. Because of the relationship of the rod to the center of gravity of the tank and the coupling studs 69, the tank is suspended from the lifting cables in somewhat downwardly forwardly tilted position with the coupling studs below the lower edge of the rear wall 58. Thus suspended, the tank is slowly lowered over the bed 12 of the truck so that a workman can guide the downwardly projecting coupling studs 69 into a pair of coupling receptacles 36 on the truck. The upwardly extended guide portions 38 of the receptacles assist in conveniently guiding the studs downwardly into engagement with the base portions. Thereafter, the latch pins 44 are inserted and the bottom wall of the tank allowed to settle onto the bed of the truck. The cable is disconnected and the next tank similarly mounted on the truck beside the tank previously so mounted. Thus the truck is loaded with a series of the tanks in closely adjacent relation in the described manner.

Figure 3:
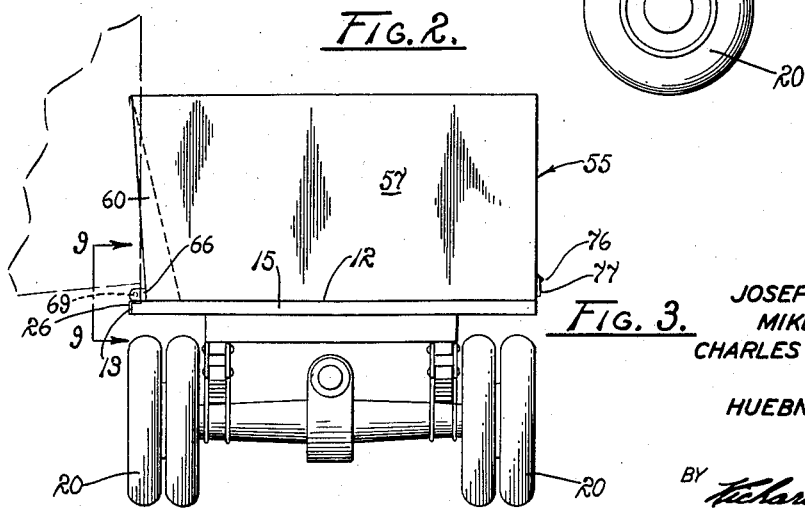
Fig. 3 is a rear end elevation of the truck and apparatus of Figs. 1 and 2 showing a tank of the apparatus in dumping position in dashed lines.

The truck 10 loaded with the tanks 55 is then driven to a winery or other point for discharge of the grapes. There, similar lifting cables are connected to the eyelets 77 and the tanks 55 individually pivoted from the rear about the studs 69 into dumping positions, as shown in dashed lines in Fig. 3. The coupling receptacles 36 and studs 69 facilitate this pivotal movement, and the latch pins 44 effectively preclude disassociation of the tanks from the receptacles.

When the tanks 55 are empty, they are lowered into transporting positions, and the truck 10 driven back to the vineyard. After the latch pins 44 are removed, the tanks are lifted by cables, not shown, connected to the rods 75. As they are lifted, the tanks again assume somewhat downwardly tilted positions so that the engagement of the studs 69 in the receptacles 36 exercise a guiding effect precluding swinging movement of the tanks until they are lifted free of the truck. Usually the tanks are returned one at a time to a vineyard truck or respective vineyard trucks for reuse in collecting grapes from the vineyard.

It will be evident from the foregoing that the subject invention minimizes handling of the grapes thereby rendering the process more sanitary and more economical. The problems described above in connection with the formation of grape juice and grape damage are obviated in large measure by employing the load handling apparatus of the present invention. It is significant to note the ease with which the tanks are releasably connected in pivoted positions on the truck 10 by suspending the tanks on the rod 75. Although the invention has been described in connection with the handling of grapes, it will be evident that it can be used to handle other commodities in a similar manner.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mobile load handling apparatus comprising a flat bed mounted for earth traversing movement in a substantially horizontal position; a pair of upwardly disposed, substantially U-shaped receptacles having base portions secured to the bed in spaced relation to each other adjacent to an edge of the bed, substantially erect outer guide portions, and inner guide portions inwardly upwardly divergently inclined with respect to their associated outer portions, the inner portions being shorter than the outer portions, the guide portions of the receptacles defining upwardly and inwardly disposed sockets in alignment along said edge of the bed; upper and lower bushings secured to the outer and lower portions, respectively, of each receptacle with the bushings on each receptacle concentric to an axis upwardly outwardly inclined from the bed in acute angular relation thereto; a substantially rectangular tank having a bottom wall and spaced front, rear and side walls upstanding from the bottom wall; a pair of pivot studs; means mounting the studs on the front wall of the tank with the studs inwardly extended toward each other in coaxial alignment transversely of the tank and forwardly spaced with respect to the front wall, and releasably slidably fitted in the the receptacles on the base portions between the inner and outer guide portions for retractable pivotal movement of the tank between a transporting position rested on the bed and a dumping position in acute angular relation to the bed; elongated rigid latch members having shanks and heads secured to said shanks, the shanks of the latch members being individually coaxially releasably slidably extended through the bushings on each receptacle with said heads gravitationally rested against the upper bushings; and an elongated rod mounted on the side walls of the tank and extended transversely thereof substantially parallel to the pivot studs and on the opposite side of the center of gravity of the tank from the studs for pendently suspending the tank in downwardly forwardly inclined position so as to facilitate slidable insertion of the studs along the inner guide portions onto the base portions of the receptacles.

2. The combination of a load transporting vehicle including an elongated flat bed, and ground engaging support wheels mounting the bed for earth traversing movement longitudinally thereof and in a substantially horizontal position; pairs of right-angular mounting brackets having horizontal flanges rested on the upper surface of the bed of the vehicle and vertical flanges downwardly extended therefrom in engagement with a longitudinal side edge of the vehicle; means mounting the brackets on the bed in longitudinally spaced relation to each other; substantially U-shaped, upwardly disposed, receptacles having opposite sides, arcuate base portions individually rigidly secured to the horizontal flanges of the brackets, upwardly extended outer guide portions, and inner guide portions upwardly inwardly extended in acute angular relation with their respective outer guide portions whereby the receptacles provide longitudinally spaced pairs of sockets aligned longitudinally of the bed, the outer guide portion being longer than the inner guide portion; upper and lower tubular bushings respectively individually secured to the outer and inner guide portions of the receptacles, the bushings for each receptacle being on the same side of the receptacle and concentric to a common axis inwardly downwardly declined toward and in acute angular relation with the bed; a plurality of substantially rectangular load receiving tanks having bottom walls, substantially parallel side walls upwardly extended from the bottom walls, rear walls upwardly extended from their respective bottom walls, the tanks being supported on the vehicle in side-by-side relation longitudinally thereof with their bottom walls rested on the upper surface of the bed and with the front walls adjacent to the receptacles; arms forwardly extended from the side walls of the tanks adjacent to their lower edges; coupling studs extended inwardly relative to each other from the arms in coaxial relation and releasably downwardly slidably fitted in adjacent pairs of sockets; fulcrum rods transversely extended between and connected to the side walls of the tanks and disposed longitudinally of the bed in vertical planes interposed between the rear walls of the tanks and the centers of gravity of the tanks; and latch pins having elongated shanks releasably slidably fitted through corresponding pairs of upper and lower bushings in concentric relation to said downwardly declined position and having heads gravitationally rested against their respective upper bushing for preventing upward movement of the coupling studs out of the sockets, the tanks being individually pivotally mounted on the bed for movement between transporting positions with the bottom walls thereof rested on the bed and inclined dumping positions, the tanks being supportable on their fulcrum rods in forwardly tilted positions for facilitating slidable receipt of the coupling studs into the receptacles.

References Cited in the file of this patent

UNITED STATES PATENTS

| | | |
|---|---|---|
| 1,069,749 | White | Aug. 12, 1913 |
| 1,965,476 | Smith | July 3, 1934 |
| 2,047,051 | Armington et al. | July 7, 1936 |

FOREIGN PATENTS

| | | |
|---|---|---|
| 104,109 | Great Britain | Feb. 22, 1917 |